4,082,309

ANTI-SWAY APPARATUS FOR TRAILERS

BACKGROUND OF THE INVENTION

1. Field of the Invention

This invention relates generally to trailer stabilizer apparatus and more particularly to apparatus for preventing or dampening trailer sway.

2. Description of the Prior Art

Trailer sway control devices of the prior art that I am aware of brake the sway of trailers by friction means. However, the amount of friction or braking is preset and when the brakes are engaged the intensity of the brakes is not variable and accordingly does not conform to the intensity of the sway. Other braking devices of the prior art utilize sliding bars which are adjustably tightened together to develop sliding friction between the bars or are provided with deformations such as notches which mate when the trailer and the towing vehicle are aligned, thus providing resistance to the vehicles getting out of alignment. Once, however, the towed trailer begins to sway, much of the effectiveness of this type of device is lost. It can be generally stated that in regards to prior art sway control devices for trailer vehicles, there exists no variability in the amount of braking control which correspond to the intensity of the trailer sway principally because the braking pressure is preset.

SUMMARY OF THE INVENTION

The sway control apparatus of my invention includes an electromagnetically actuated drum brake mounted on the draw bar frame of the towed trailer. Means are provided on the drum brake to which are connected ends of chain lengths. The other ends of the chains extend forward and connect to opposite ends of a cross bar member which is fixed to the hitch means directly below the hitch ball. The cross bar member and the two spaced chains connected to the brake drum form a parallelogram wich is normally free to shift positions during normal driving such as when turning corners since the rotatable part of the drum is disengaged from the brake shoes; however, when the brake shoes are actuated by the driver in the towing vehicle, the braking action fixes the parallelogram in the position that it shifted to, due to the sway, thereby braking the sway at that position and preventing or dampening a return sway or the beginning of the oscillatory motion of the trailer vehicle. Since the actuation of the sway brake device is connectd to and works in unison with the wheel brakes of the trailer and both are actuated manually by the driver of the towed vehicle, the intensity of the braking power and the amount of time of braking is under the control of the driver who is in a much better position to judge these factors rather than have these factors preset. Further, by having the sway brake device acting in unison with the wheel brakes of the trailer with regard to time and intensity, jacknifing of the trailer vehicle is prevented under conditions when jackknifing normally occurs such as slippery road conditions.

I further provide an air pressure sensing device at the side of the trailer adjacent the rear thereof which is sensitive to sudden air pressure changes frequently caused by passing truck vehicles in close proximity whereby the air currents surrounding the truck exert sufficient side forces to cause swaying of the trailer. Such a pressure switch located at the side of the trailer will close an electric circuit activating the sway brake device of this invention independently of the drivers manual control and also independently of the wheel brakes of the trailer, to immediately activate the sway brake thereby preventing the initiation of trailer sway. Immediately upon passing of such vehicles causing eddy currents and the attendant side forces, the atmospheric pressure will return to normal deactivating the switch to open the circuit and release the sway brake.

Other objects and advantages of my invention will become more apparent after a careful study of the following detailed decription taken together with the accompanying drawings which illustrate a preferred embodiment of my invention.

DESCRIPTION OF THE PREFERRED EMBODIMENT

Figure 4:
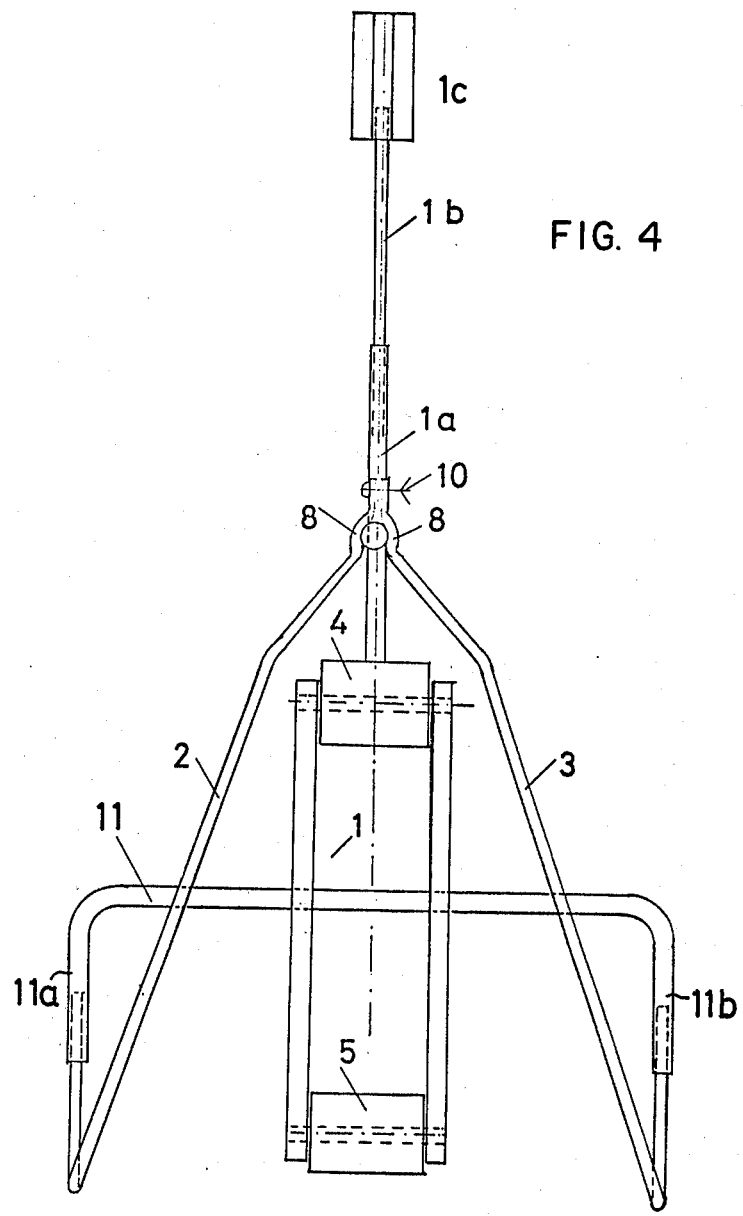
FIG. 4 is a detail view of chain link connecting means of the hitch bar shown in fragment.
Figure 1:
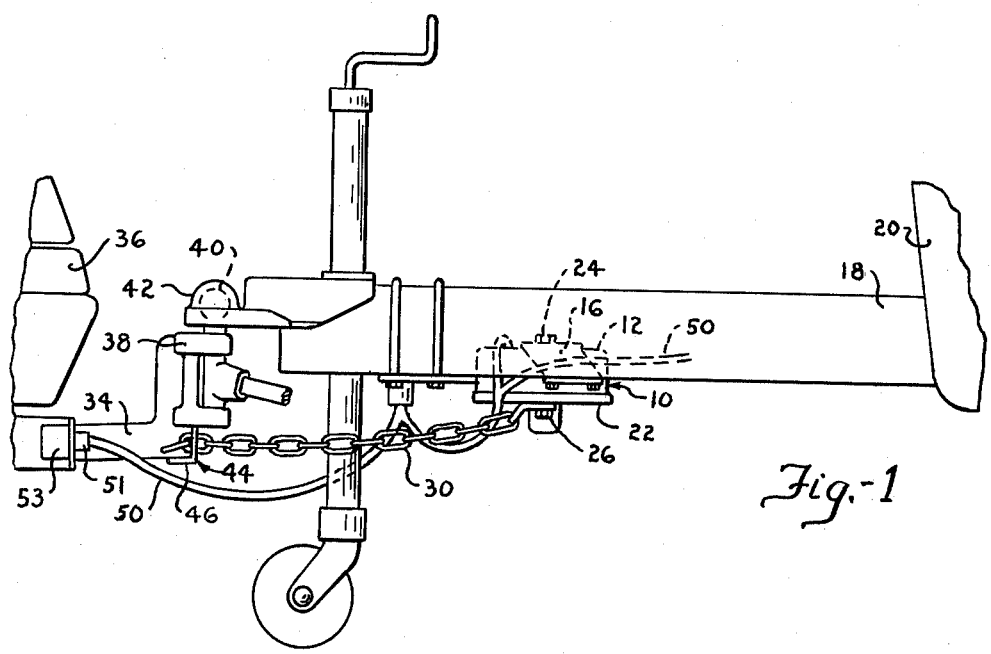
FIG. 1 is a side view of the sway brake device of this invention mounted on the trailer draw bar connected to the hitch ball of a towing vehicle.
Figure 2:
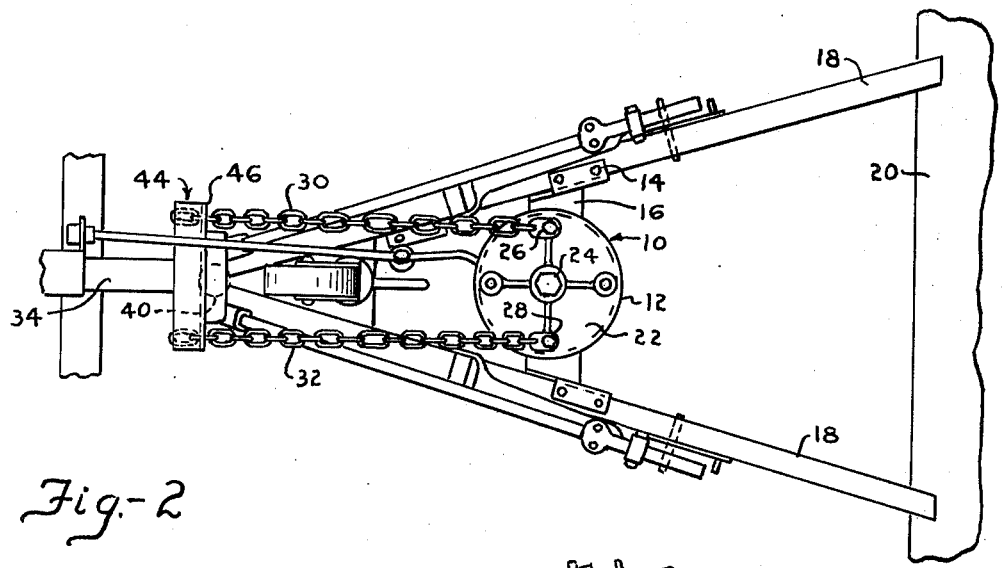
FIG. 2 is a bottom view of the apparatus of FIG. 1 showing in fragment the towing and towed vehicles in alignment.
Figure 3:
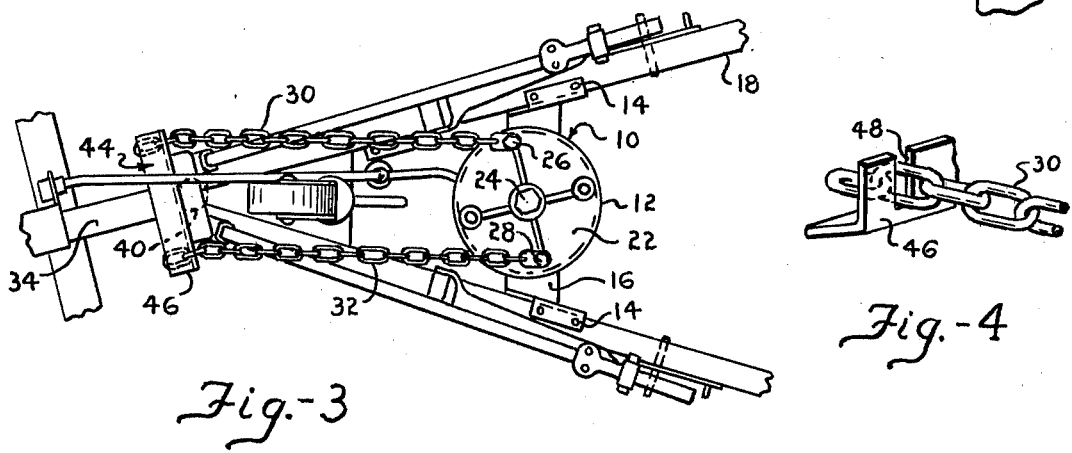
FIG. 3 is another bottom view similar to FIG. 2 but showing the vehicles out of longitudinal alignment.
Figure 4:
Figure 7:
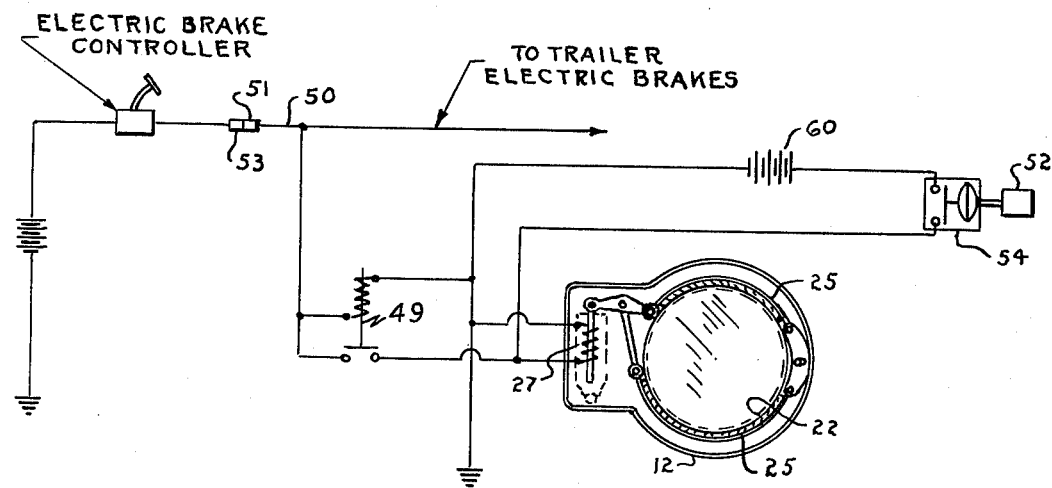
FIG. 7 is a diagramatic representation of the brake activating circuit of this invention.

Referring now more particularly to the drawings, reference numeral 10 designates generally the sway brake of my invention. It comprises in general a drum casing 12 mounted onto cross bar 16 which is connected at the ends thereof on A-frame draw bar 18 of trailer 20 by means of bolts 14. The rotatable drum 22 is supported to the drum casing 12 by means of center bolt 24 which also serves to connect drum casing 12 to cross bar 16. Drum casing 12 contains the expandable brake shoe mechanism 25 which is linked to an electromagnetic drive means 27 which activates brake shoes 25 to bear against the friction surface of rotatable drum 22. The component parts interior of the drum casing 12 is shown in FIG. 7 only diagramatically and will not be described in greater detail since such brake mechanisms are well known to the prior art and commercially available. Extending from the bottom of brake drum 22 at diametrally opposite points are bolt lugs 26 and 28 to which are connected the ends of restraining chain links 30 and 32, respectively. Provided on hitch bar 34 extending from the chassis of the towing vehicle 36 is hitch post 38 carrying the customary hitch ball 40 to which is connected ball hitch 42 extending from the end of A-frame draw bar 18 of trailer vehicle 20. Also provided on hitch bar 34 is a laterally disposed plate 44. Plate 44 of my embodiment is an angle bar 46 for strength and simplicity in forming a chain hitching means as illustrated in FIG. 4. I provide slots 48 in the ends of plate 44 to serve as connecting means for the other end of sway restraining chain links 30 and 32. Electric cord 50 is provided with a plug 51 which is adapted to fit into the receptacle 53 on the towing vehicle 36 to make connection with the electric brake controller circuit of the towing vehicle as shown diagramatically in FIGS. 1 and 7. It extends from the towing car at one end, through solenoid operated switch 49 to the electromagnetic brake device 27 in brake drum casing 12 at the other end thereof. Connection is further made to the electric energized brakes of the trailer wheels which are not shown.

Figure 5:
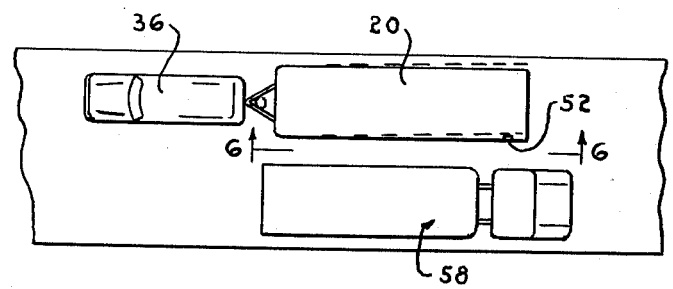
FIG. 5 is a top view of a pictorial representation showing a truck passing a towed trailer in close proximity.
Figure 6:
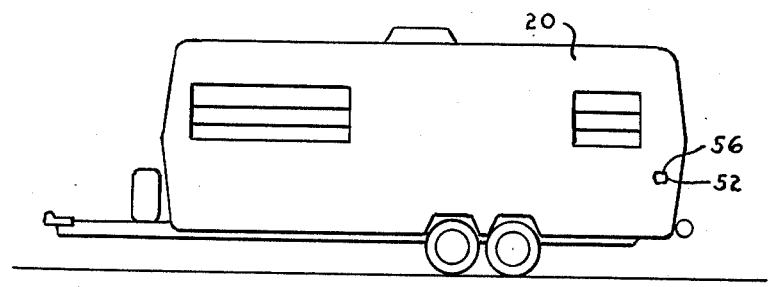
FIG. 6 is a side view of the trailer as viewed along line 6—6 of FIG. 5.

With particular reference to FIGS. 5 to 7, pressure sensor element 52 of pressure switch 54 of this invention is mounted in a side of the trailer body, adjacent the trailing end thereof as at 58. Pressure switch 54 acts to close and open an electric circuit shown diagramatically in FIG. 7 which includes the electromagnetic mechanism 27 in brake drum casing 12 to activate brake shoes 25 to bear against the friction surface of brake drum 22 independent of the brake circuit manually controlled by the operator of the towing vehicle through cord 50. Pressure sensor element 52 and pressure switch 54 is shown diagramatically since such devices are well known to the prior art and are commercially available. One such switch is the Minitactor (TM) pressure switch covered by U.S. Pat. No. 3,862,387, manufactured by Dwyer Instruments, Inc. However, any similar pressure switch can be used. I prefer to place the pressure sensor element 5 of switch 54 at the lower portion of body of trailer 20 as at 56. However, it is understood that its precise location is subject to experimentation since it is desired to locate it at a position of greatest side force resulting from eddy currents of passing vehicles such as truck 58. The location will differ somewhat for every make of trailer body due to variables such as size and shape.

In accordance with the principles of this invention, application of the brake pedal in towing vehicle 36 will activate a circuit which causes the braking of the wheels of trailer 20 in unison with the brakes of towing vehicle 36. This is accomplished by providing a receptacle 53 for a plug mounted at the rear end of towing vehicle 36 and in which is inserted male plug 51 of cord 50. This circuit also closes the electromagnetic switch in brake drum casing 12 causing a braking action, the intensity and the duration of which is controlled by the driver in the towing vehicle.

The sway braking action occurs when the brake pedal in the towing vehicle is pressed either before or after the swaying begins so that the parallelogram formed by the chain link members 30 and 32 is restrained in its configuration thereby restraining or dampening the sway of the trailer vehicle 20. If swaying of the trailer vehicle occurs due to side wind pressures such as when a vehicle such as a truck passes the trailer vehicle in close proximity, as illustrated in FIG. 5, it would not be a desirable maneuver to apply the brakes of the towing vehicle in order to activate the anti-sway brake apparatus of this invention. Accordingly, in combination with the anti-sway braking apparatus of this invention, I include pressure switch 54 which is activated by pressure sensor element 52 located on the trailing end of the trailer vehicle 20 as at 56, to an independent circuit illustrated in FIG. 7 to activate the electromagnetic brake mechanism 27. This circuit is completed when pressure element 52 senses a pressure increase against the side of the trailer vehicle. This circuit can be powered by connection to the hot line of the brake circuit of the towing vehicle or by a separate battery source provided in the trailer vehicle as at 60. Such an independent circuit would immediately activate the electromagnetic brake mechanism 27 causing brake shoes 25 to stop the free rotation of drum 22 upon sensing any pressure change against the side of the towed trailer 20 resulting in the anti-sway device 10 being activated prior to initiation of the actual sway. As soon as the passing vehicles clear each other, side wind pressures caused by the eddy currents caught between the vehicles will return to normal and the pressure sensor element 52 will deactivate switch 54 of this circuit releasing the braking action of the anti-sway brake apparatus of this invention.

I claim:

1. An anti-sway apparatus for a towing and trailer vehicle combination comprising the combination of:
   means on said trailer vehicle connecting said towing vehicle for braking the sway of said trailer vehicle;
   means in a side of said trailer vehicle for sensing change in air pressure against said side of said trailer vehicle;
   electric circuit means energized by said means in said side of said trailer vehicle, said energized electric circuit means actuating said means on said trailer vehicle to brake the sway of said trailer vehicle.

2. An anti-sway apparatus for a towing and trailer vehicle combination comprising the combination of:
   means on said trailer vehicle connecting said towing vehicle for braking the sway of said trailer vehicle, said means comprising a freely rotatable brake drum member, brake shoe members for bearing against said drum member and an electromagnetic device to move said shoe members against said drum member;
   means in a side of said trailer vehicle for sensing change in air pressure against said side of said trailer vehicle;
   electric circuit means energized by said means in said side of said trailer vehicle, said electric circuit means energizing said electromagnetic device to brake said drum member.

3. In a towing and trailer vehicle combination wherein said towing vehicle is provided with brake actuating means, an electric circuit energized by said brake actuating means and hitch bar means extending rearwardly from said towing vehicle, and wherein said trailer vehicle is provided with draw bar means, and hitch means for connection to said hitch bar of said towing vehicle, an anti-sway apparatus for said trailer vehicle comprising the combination of:
   a drum brake housing comprising a freely rotatable brake member horizontally mounted to the draw bar of the trailer vehicle; actuating means to brake said freely rotatable brake member; a laterally extending bar member connected to said hitch bar means; spaced connecting members provided on said freely rotatable brake member; elongated link members connecting said connecting members on said rotatable brake member and the ends of said laterally extending bar member forming a variable parallelogram configuration; and power transmission means connecting said brake actuating means of said towing vehicle and said actuating means for braking said rotatable brake member of said trailer vehicle; and
   a pressure sensing means provided on the side of said trailer vehicle, an electric circuit independent of said brake actuating means of said towing vehicle, including said actuating means to brake said freely rotatable brake member, a switch actuated by said pressure sensing means and an electric power source.

4. An anti-sway apparatus for a towing and trailer vehicle combination comprising the combination of:
pressure sensing means on the side of said trailer vehicle;
a drum brake housing comprising a freely rotatable brake member horizontally mounted to the draw bar of the trailer vehicle; actuating means to brake said freely rotatable brake member; and stabilizing means connecting said rotatable brake member to said towing vehicle; and
an electric circuit including said actuating means to brake said freely rotatable brake member, a switch actuated by said pressure sensing means and an electric power source.

5. The anti-sway combination of claim 4 wherein said means to brake said freely rotatable brake member is further characterized as being an electromagnetic device linked to brake shoes adapted to bear against said freely rotatable brake member.

* * * * *